United States Patent
Caroll et al.

(10) Patent No.: US 10,655,762 B2
(45) Date of Patent: May 19, 2020

(54) THREADED RETAINER

(71) Applicant: Oetiker NY, Inc., Lancaster, NY (US)

(72) Inventors: James E. Caroll, Aurora, OH (US);
Joseph A. Giarrizzo, Amherst, NY (US)

(73) Assignee: Oetiker NY, Inc., Lancaster, NY (US)

( * ) Notice: Subject to any disclaimer, the term of this patent is extended or adjusted under 35 U.S.C. 154(b) by 139 days.

(21) Appl. No.: 15/723,316

(22) Filed: Oct. 3, 2017

(65) Prior Publication Data

US 2018/0094752 A1 Apr. 5, 2018

Related U.S. Application Data (60) Provisional application No. 62/404,446, filed on Oct. 5, 2016.

(51) Int. Cl.
| | | |
|---|---|---|
| *F16L 27/08* | (2006.01) | |
| *F16L 19/025* | (2006.01) | |
| *F16L 27/12* | (2006.01) | |

(52) U.S. Cl.
CPC ......... *F16L 19/025* (2013.01); *F16L 27/0816* (2013.01); *F16L 27/125* (2013.01); *F16L 27/1274* (2019.08); *F16L 2201/10* (2013.01)

(58) Field of Classification Search
CPC ...... F16L 27/0816; F16L 15/02; F16L 19/025
USPC .................................................. 285/353, 384
See application file for complete search history.

(56) References Cited

U.S. PATENT DOCUMENTS

| | | | |
|---|---|---|---|
| 676,846 A | * | 6/1901 | Moran ................ F16L 27/0816 |
| | | | 285/281 |
| 1,096,436 A | | 5/1914 | Leyner |
| 1,998,632 A | * | 4/1935 | McLaughlin ....... F16L 27/0816 |
| | | | 285/281 |
| 2,477,677 A | | 8/1949 | Woodling |
| 2,907,590 A | | 10/1959 | Oswald |
| 4,025,092 A | | 5/1977 | Wakefield |
| 4,691,944 A | | 9/1987 | Viall, Jr. |
| 5,060,987 A | * | 10/1991 | Miller ................... F16L 19/025 |
| | | | 285/328 |
| 5,160,178 A | | 11/1992 | Iwabuchi |
| 5,516,157 A | * | 5/1996 | Williamson .......... F16L 27/093 |
| | | | 285/353 |

(Continued)

FOREIGN PATENT DOCUMENTS

| | | | | |
|---|---|---|---|---|
| DE | | 229760 A1 | 11/1985 | |
| FR | | 1428767 A | * 2/1966 | .......... F16L 27/0816 |

(Continued)

*Primary Examiner* — David Bochna
(74) *Attorney, Agent, or Firm* — Simpson & Simpson, PLLC (57) ABSTRACT

A threaded retainer including a body having a through-bore therein, a first screw thread operatively arranged on an outer surface of the body, wherein, the first screw thread is arranged to secure the threaded retainer to a fluid connector having a second screw thread, the first screw thread corresponding with the second screw thread, a first shoulder arranged on the body, wherein the first shoulder is arranged to abut against a second shoulder of the fluid connector, and an axial gap between the fluid connector and the threaded retainer, wherein the axial gap is formed when the fluid connector is secured to the threaded retainer.

20 Claims, 9 Drawing Sheets

(56) References Cited

U.S. PATENT DOCUMENTS

| | | | |
|---|---|---|---|
| 6,089,623 A * | 7/2000 | Schroeder | F16L 19/0286 |
| | | | 285/353 |
| 6,598,908 B1 | 7/2003 | Wosik | |
| 6,604,762 B2 | 8/2003 | Sagaser | |
| 7,032,934 B2 | 4/2006 | Wosik | |
| 7,568,737 B2 | 8/2009 | Wells et al. | |
| 2004/0212191 A1 | 10/2004 | Segal et al. | |
| 2010/0019488 A1 | 1/2010 | Weimer | |
| 2015/0145240 A1 | 5/2015 | Kujawski et al. | |
| 2016/0238173 A1 | 8/2016 | Kujawski, Jr. | |
| 2016/0273686 A1 | 9/2016 | Considine, Jr. et al. | |
| 2017/0152975 A1 * | 6/2017 | Huang | F16L 5/025 |

FOREIGN PATENT DOCUMENTS

| | | | |
|---|---|---|---|
| GB | 2314392 | 12/1997 | |
| JP | 10185025 A * | 7/1998 | F16L 19/025 |
| WO | WO-2019029980 A1 * | 2/2019 | F16L 19/025 |

* cited by examiner

THREADED RETAINER

CROSS-REFERENCE TO RELATED APPLICATIONS

This application claims the benefit under 35 U.S.C. § 119(e) of U.S. Provisional Application No. 62/404,446, filed Oct. 5, 2016, which application is incorporated herein by reference in its entirety.

FIELD OF THE INVENTION

This disclosure relates generally to a fluid connector, and, more specifically, to a fluid connector including a threaded retainer arranged to secure a mating tube to a fluid connector. The fluid connector has a corresponding threaded surface which engages with the threaded surface of the retainer. This threaded arrangement allows for a torque feedback to ensure that the retainer is fully secured to the fluid connector.

BACKGROUND OF THE INVENTION

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors.

When fluid connectors are secured to devices such as radiators, tubular connectors inserted into these fluid connectors may not be fully seated and allow leak paths to form once the assembly is pressurized. Current tubular connectors include a witness bead which is used as a visual indicator of proper sealing, but these witness beads are not always reliable as it is dependent on a human user to check. Even if the witness bead appears properly inserted, small leak paths could form due to misalignment of the tubular connector within the fluid connector undetectable to the naked eye.

In addition to a witness bead, an retainer may be used to further secure and verify the tubular connector is properly inserted into the fluid connector. The retainer is installed concentrically about the tubular connector and snaps over an outer circumference of the fluid connector. In some instances, the retainer may only partially secure to the fluid connector since these fluid connectors are typically installed in the confined spaces of an engine bay of an automobile. Moreover, a user may not be able to hear the audible "click" sound when the retainer fully secures to the fluid connector, leading to the tubular connector blowing out of the fluid connector since it was not fully installed.

Thus, there has been a long-felt need for a retainer which can be secured to a fluid connector which allows a user to positively ensure that the retainer is properly seated such that the tubular connector is secured within the fluid connector and to ensure no excessive strain is placed on the fluid connector joint or subsequent components.

BRIEF SUMMARY OF THE INVENTION

The present disclosure broadly comprises a threaded retainer including a body having a through-bore therein, a first screw thread operatively arranged on an outer surface of the body, wherein, the first screw thread is arranged to secure the threaded retainer to a fluid connector having a second screw thread, the first screw thread corresponding with the second screw thread, a first shoulder arranged on the body, wherein the first shoulder is arranged to abut against a second shoulder of the fluid connector, and an axial gap between the fluid connector and the threaded retainer, wherein the axial gap is formed when the fluid connector is secured to the threaded retainer.

Additionally, the present disclosure broadly includes a threaded retainer, including a body, the body having a first through-bore therein, a threaded section having a first screw thread operatively arranged on an outer surface of the body, and a first shoulder arranged on the outer surface, wherein the first shoulder is arranged to abut against a second shoulder arranged on a fluid connector, the abutting of the first shoulder and the second shoulder forming an axial gap between the threaded retainer and the fluid connector when the threaded retainer and the fluid connector and secured together.

Even further, the present disclosure broadly includes a fluid connector assembly including a threaded retainer having a first body, the body having a first through-bore and a first counter-bore therein, a first screw thread operatively arranged on an outer surface of the first body, and a first shoulder arranged on the outer surface, a fluid connector having a second body, the second body having a second through-bore and a second counter-bore therein, forming an inner surface, a second screw thread formed on the inner surface of the second counter-bore, and a second shoulder arranged to abut against the first shoulder of the threaded retainer, wherein, an axial gap is formed between the threaded retainer and the fluid connector when secured together, and a tubular connector having a tube barb extending radially outward, the tube barb arranged within the axial gap.

A primary object of this disclosure is to provide a threaded retainer which utilizes a threaded surface on the retainer and a corresponding threaded surface on a fluid connector which provides a torque feedback in order to determine if the retainer is properly and fully secured to the fluid connector. Additionally, another object of this disclosure is to provide a threaded retainer which seals to prevent fluid from leaking out of a pressurized system while allowing a tubular connector to rotate relative to the threaded retainer and connector, which is secured to the fluid connector.

These and other objects, features and advantages of the present disclosure will become readily apparent upon a review of the following detailed description, in view of the drawings and appended claims.

BRIEF DESCRIPTION OF THE DRAWINGS

The nature and mode of operation of the present disclosure will now be more fully described in the following detailed description of the disclosure taken with the accompanying figures, in which.

DETAILED DESCRIPTION OF THE INVENTION

At the outset, it should be appreciated that like drawing numbers on different drawing views identify identical, or functionally similar, structural elements of the disclosure. It is to be understood that this disclosure is not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing.

Furthermore, as used herein, "and/or" is intended to mean a grammatical conjunction used to indicate that one or more of the elements or conditions recited may be included or occur. For example, a device comprising a first element; a second element and/or a third element; is intended to be construed as any one of the following structural arrangements: a device comprising a first element; a device comprising a second element; a device comprising a third element; a device comprising a first element and a second element; a device comprising a first element and a third element; a device comprising a first element; a second element and a third element; or, a device comprising a second element and a third element.

Figure 1:
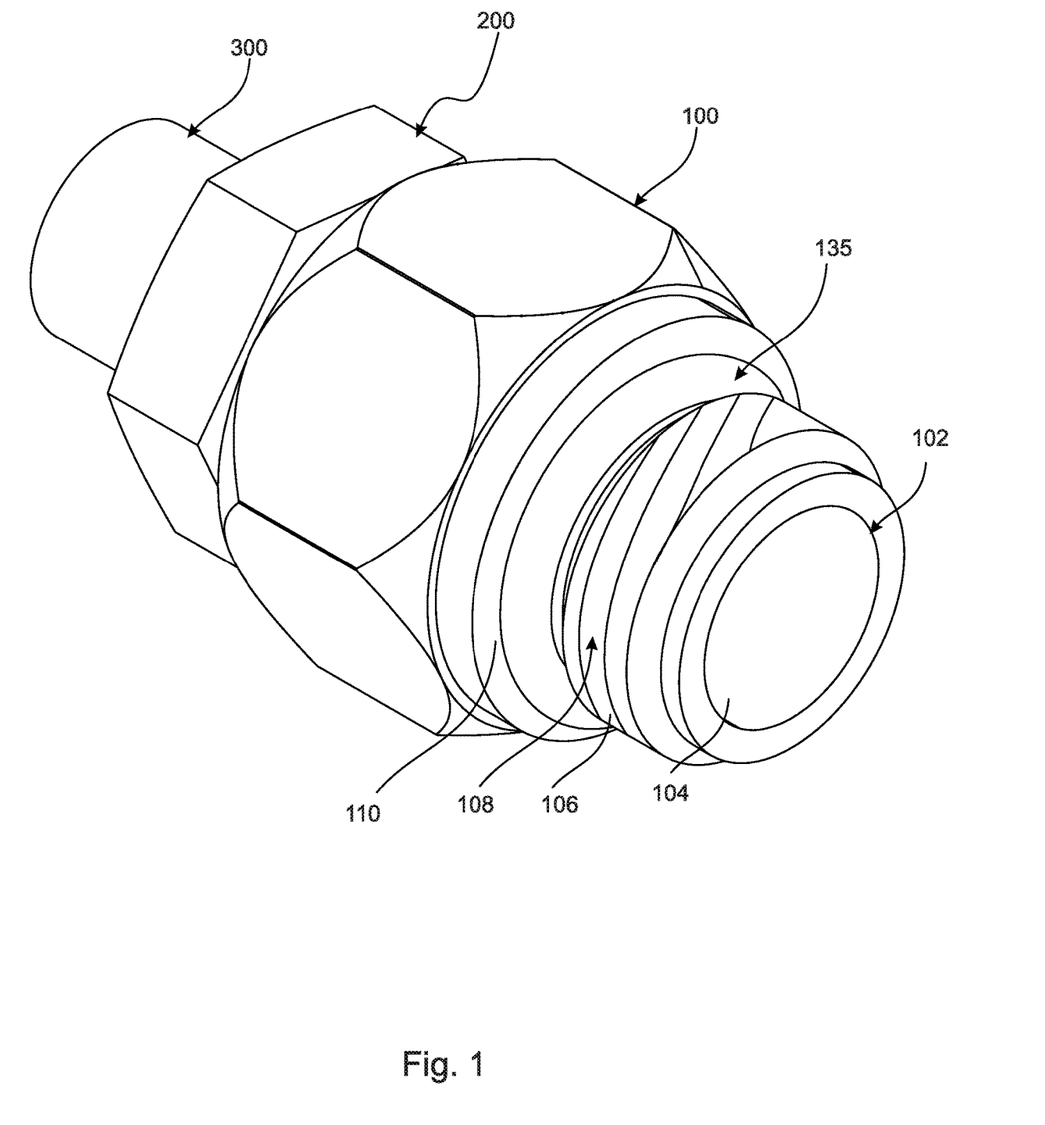
FIG. 1 is a perspective view of a fluid connector, a threaded retainer, and a tubular connector.

Adverting now to the figures, FIG. 1 is a perspective view of fluid connector 100, threaded retainer 200, and tubular connector 300. The assembly is used in fluid transfer applications, particularly in pressurized fluid systems. Threaded retainer 200 is concentrically arranged about tubular connector 300. In an example embodiment, tubular connector 300 further includes a hose or elongated body in order to connect the assembly to other fluid transfer components.

Figure 2A:
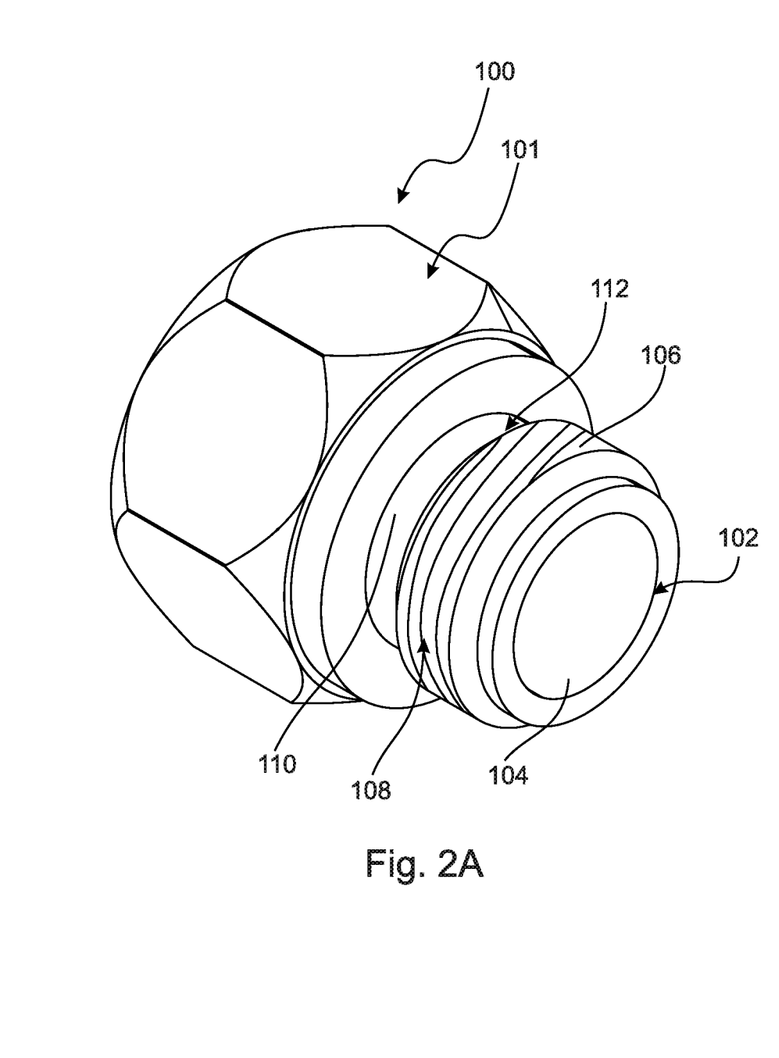
FIG. 2A is a front perspective view of the fluid connector.
Figure 2B:
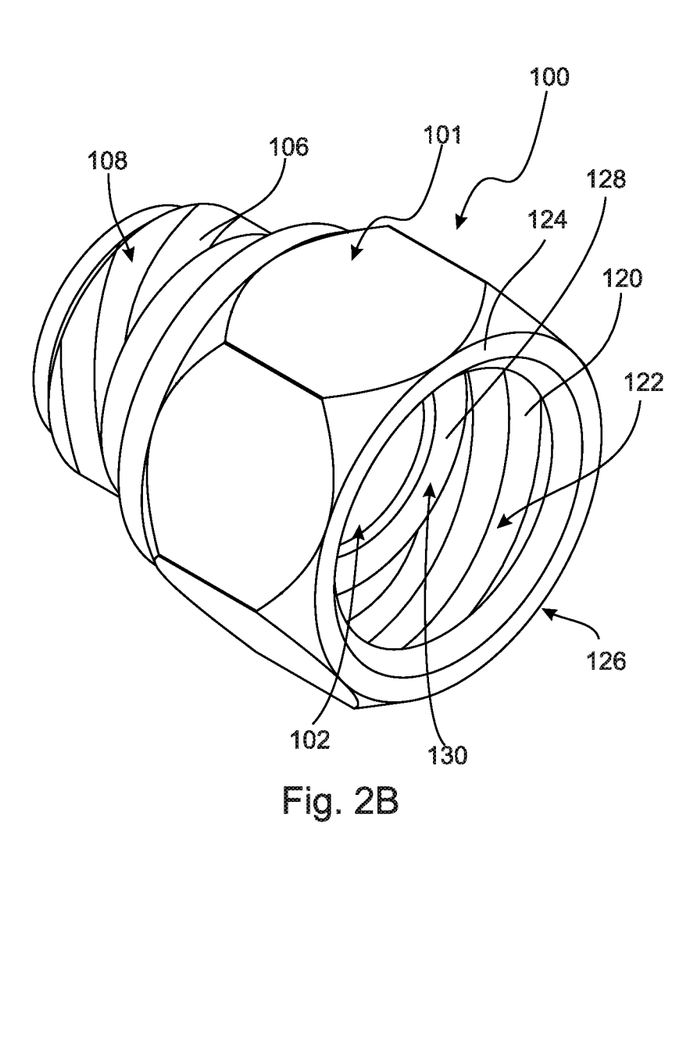
FIG. 2B is a rear perspective view of the fluid connector.

FIG. 2A and FIG. 2B are a front perspective view and a rear perspective view of fluid connector 100, respectively. Fluid connector 100 broadly includes body 101, through-bore 102, inner surface 104, outer surface 106, threads 108, surface 110, channel 112, inner surface 120, threads 122, shoulder surface 124, shoulder 126, shoulder surface 128, and inner shoulder 130. Through-bore 102 is arranged within body 101 of fluid connector 100 and allows for the passage of fluid through fluid connector 100. Inner surface 104 is formed from the manufacture of through-bore 102 within body 101. Threads 108 are arranged on outer surface 106 and allow fluid connector 100 to be secured to a fluid transfer device, such as a radiator or transmission. Channel 112 is arranged to secure seal 135 along surface 110. In an example embodiment, seal 135 is a rubber O-ring. It should be appreciated, however, that any suitable seal could be used in place of a rubber O-ring. Inner surface 120 is formed from through-bore 102. Threads 122 are arranged on inner surface 120 and are used to secure fluid connector 100 to threaded retainer 200. In an example embodiment, threads 122 are female screw threads. Shoulder 126 is arranged to abut against threaded retainer 200 along shoulder surface 124. Shoulder 126 allows for threaded retainer 200 to "bottom out" on surface 124, allowing axial gap AG (shown in FIG. 7B) to form between fluid connector 100 and threaded retainer 200 within through-bore 102. In an example embodiment, fluid connector 100 is manufactured from a suitable metallic or plastic material. It should be appreciated that any suitable material can be used in manufacturing fluid connector 100. Inner shoulder 130 allows tube barb 306 (shown in FIG. 4) to abut against shoulder surface 128.

Figure 3A:
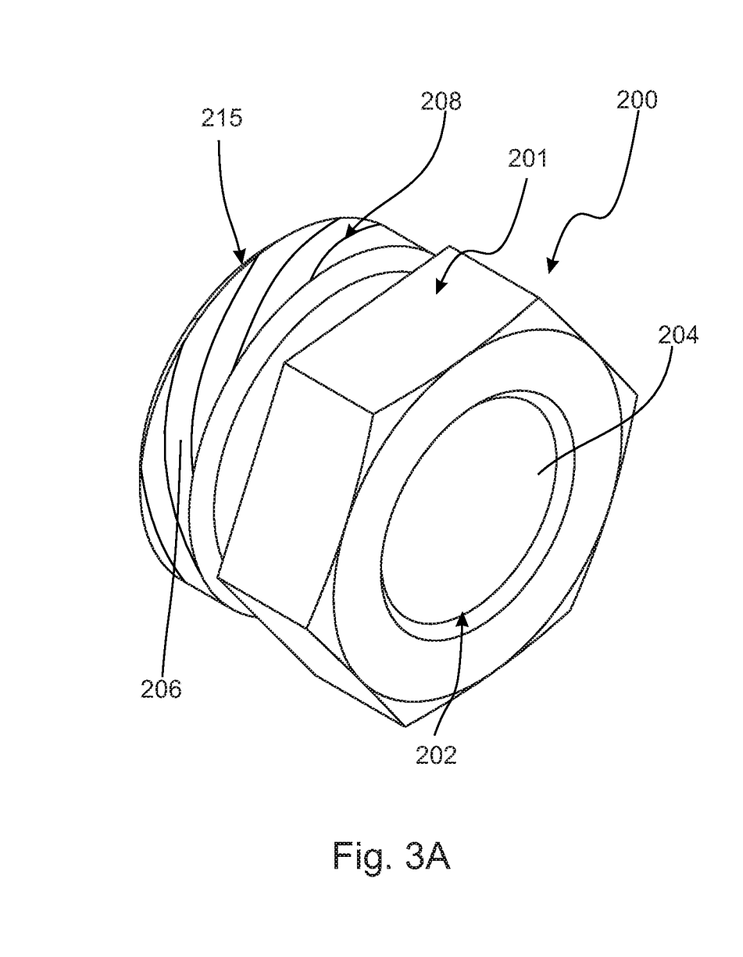
FIG. 3A is a front perspective view of the threaded retainer.
Figure 3B:
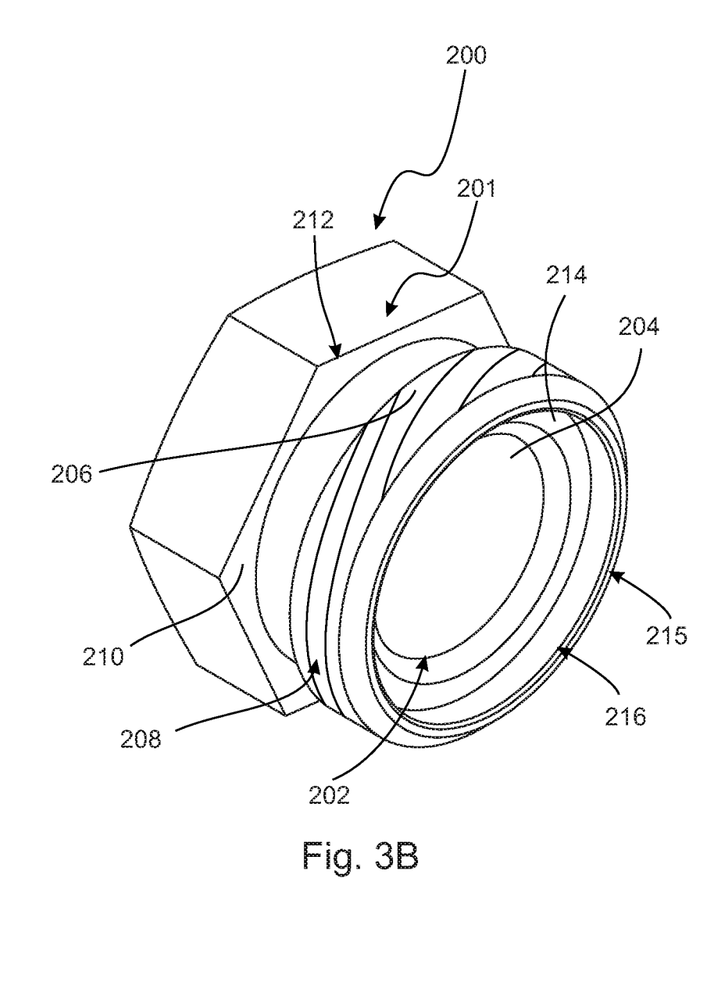
FIG. 3B is a rear perspective view of the threaded retainer.

FIG. 3A and FIG. 3B are a front perspective view and a rear perspective view, respectively, of threaded retainer 200. Threaded retainer 200 broadly includes body 201, through-bore 202, inner surface 204, outer surface 206, threads 208, shoulder surface 210, shoulder 212, shoulder surface 214, distal or insertion end 215, and shoulder 216. Through-bore 202 is formed within body 201 of threaded retainer 200 and allows for the insertion of tubular connector 300 within threaded retainer 200. Inner surface 204 is formed by through-bore 202 within body 201. Threads 208 are arranged on surface 206 and allow threaded retainer 200 to be secured to fluid connector 100. In an example embodiment, threads 208 are male screw threads. Shoulder 212 is arranged to abut against fluid connector 100 along surfaces 210 and 124, respectively. As stated previously, shoulder 212 allows for threaded retainer 200 to "bottom out" along surface 210 and shoulder surface 124 of fluid connector 100, allowing axial gap AG (shown in FIG. 7B) to form between fluid connector 100 and threaded retainer 200 within through-bore 102. This formation of axial gap AG (shown in FIG. 7B) allows tubular connector 300 to rotate relative to fluid connector 100 and threaded retainer 200 when fluid connector 100 and threaded retainer 200 are secured to one another. The ability of relative rotation of tubular connector 300 prevents excessive twisting and stress on tubular connector 300 or a corresponding hose or tube attached to tubular connector 300. Axial gap AG (shown in FIG. 7B) is formed by shoulder surface 128 of shoulder 130 and surface 214 of shoulder 216. Shoulder 216 secures tubular connector 300 within axial gap AG without preventing rotation of tubular connector 300. In some embodiments, axial gap AG is formed between distal or insertion end 215 and shoulder surface 128.

Figure 4:
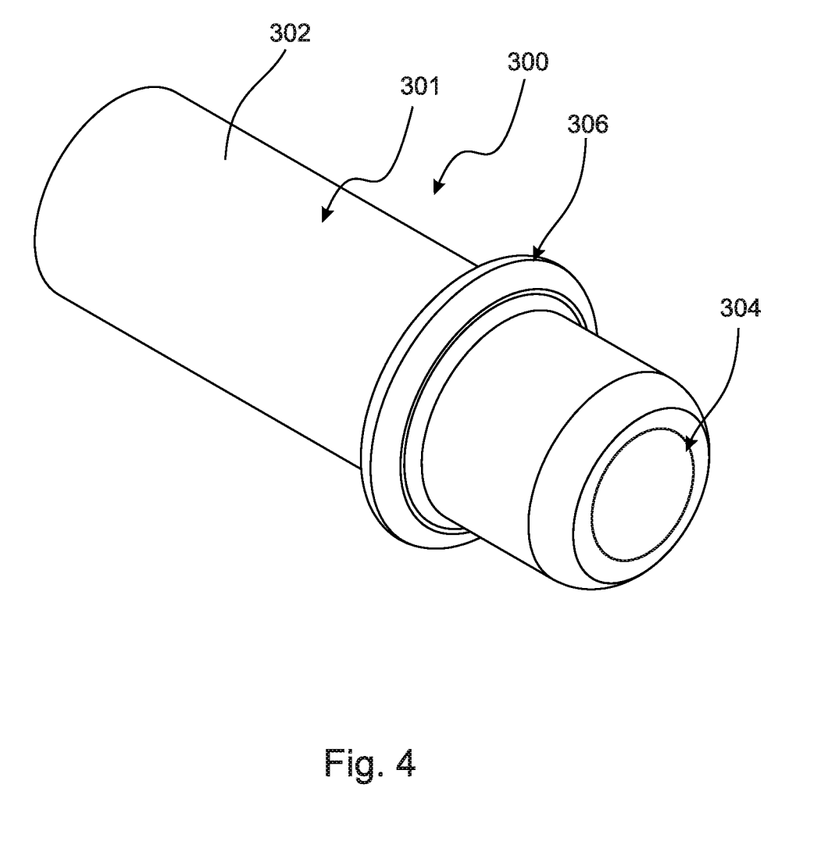
FIG. 4 is a perspective view of the tubular connector.

FIG. 4 is a perspective view of tubular connector 300. Tubular connector 300 broadly includes body 301, surface 302, through-bore 304, and tube barb 306. Through-bore 304 is formed within body 301 of tubular connector 300 and allows for passage of fluid through tubular connector 300. Tube barb 306 radially extend outward from surface 302 and is the portion of tubular connector 300 which is secured within axial gap AG (shown in FIG. 7B), formed between fluid connector 100 and threaded retainer 200. In an example embodiment, tubular connector 300 further includes an elongated body or a hose or tube secured to tubular connector 300 is transfer fluid. Additionally, tubular connector 300 can be manufactured from a metallic material, plastic material, or any suitable material.

Figures 5A, 5B:
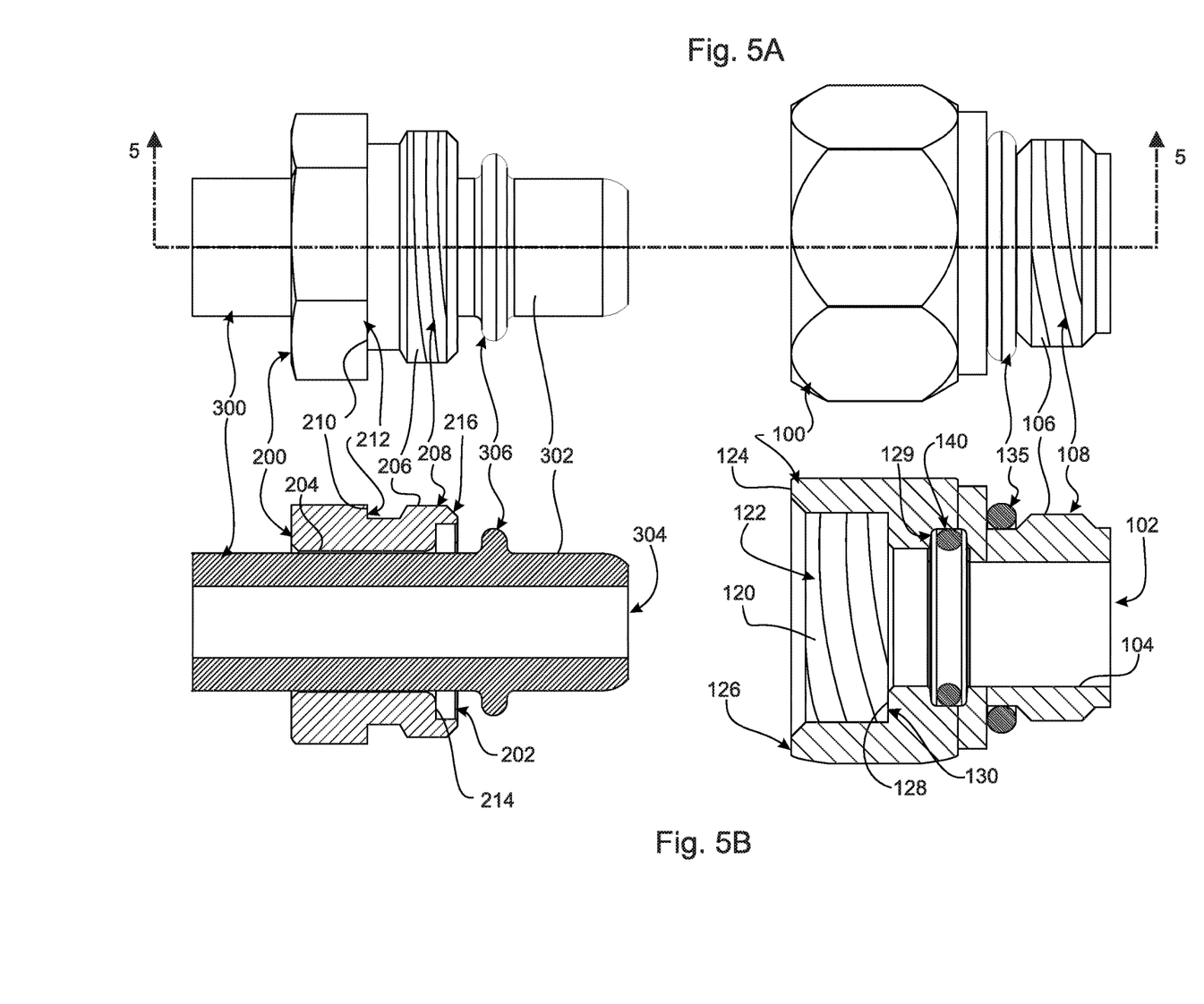
FIG. 5A is a side view of the fluid connector, threaded retainer, and tubular connector with the tubular connector not inserted within the fluid connector.
FIG. 5B is a cross-sectional view of the fluid connector, threaded retainer, and tubular connector taken generally along line 5-5 in FIG. 5A with the tubular connector not inserted within the fluid connector.

FIG. 5A and FIG. 5B are a side view and a cross-sectional view taken generally along line 5-5 in FIG. 5A of fluid connector 100, threaded retainer 200, and tubular connector 300 with tubular connector 300 not inserted within fluid connector 100, respectively. In an example embodiment, fluid connector 100 is secured within a fluid transfer device prior to insertion of tubular connector 300 and threaded retainer 200. It should be appreciated however, that tubular connector 300 and/or threaded retainer 200 can be secured to fluid connector 100 prior to installment on a fluid transfer device.

Figures 6A, 6B:
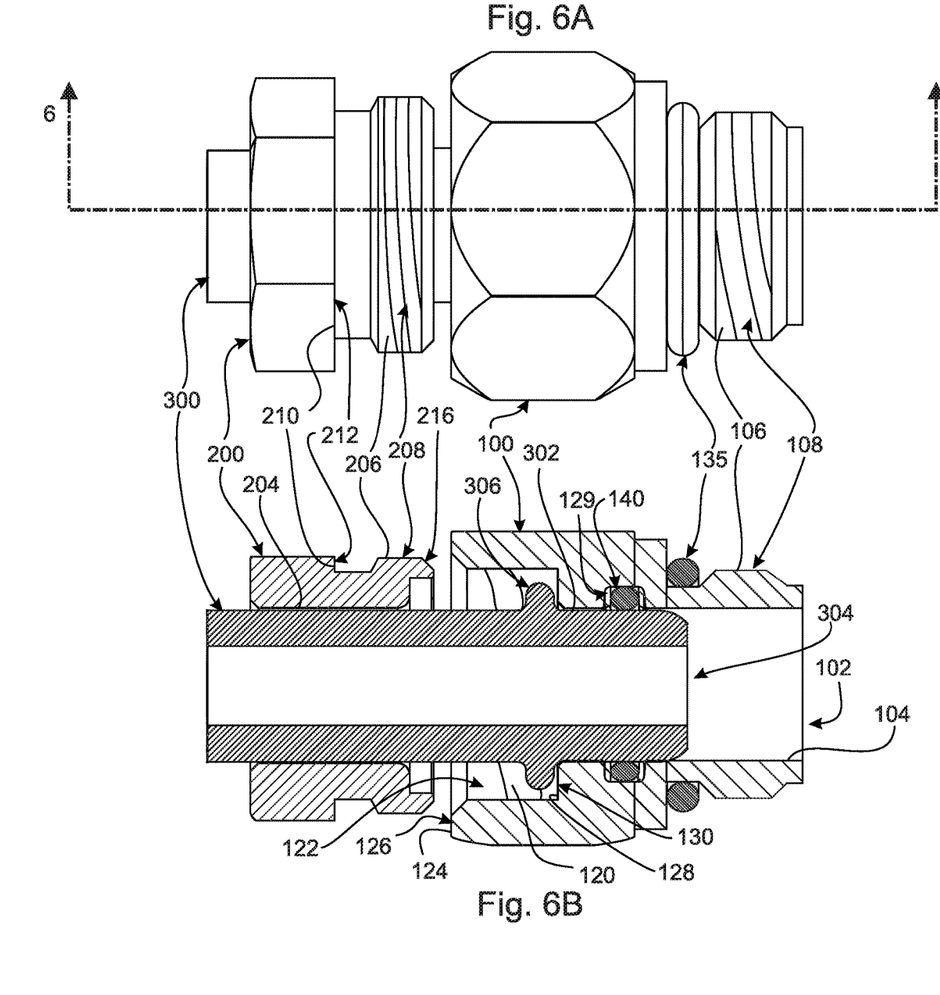
FIG. 6A is a side view of the fluid connector, threaded retainer, and tubular connector with the threaded retainer not secured to the fluid connector.
FIG. 6B is a cross-sectional view of the fluid connector, threaded retainer, and tubular connector taken generally along line 6-6 in FIG. 6A with the threaded retainer not secured to the fluid connector.

FIG. 6A and FIG. 6B are a side view and a cross-sectional view taken generally along line 6-6 in FIG. 6A of fluid connector 100, threaded retainer 200, and tubular connector 300 with threaded retainer 200 not secured to fluid connector 100, respectively. As tubular connector 300 is arranged within fluid connector 100, seal 140 abuts against surface 302 of tubular connector 300. Seal 140 is arranged within channel 129 of fluid connector 100. In an example embodiment, seal 140 is a rubber O-ring. It should be appreciated, however, that any suitable seal could be used in place of a rubber O-ring. Tube barb 306 abuts against surface 128 of shoulder 130 to ensure tubular connector is fully inserted into fluid connector 100.

Figures 7A, 7B:
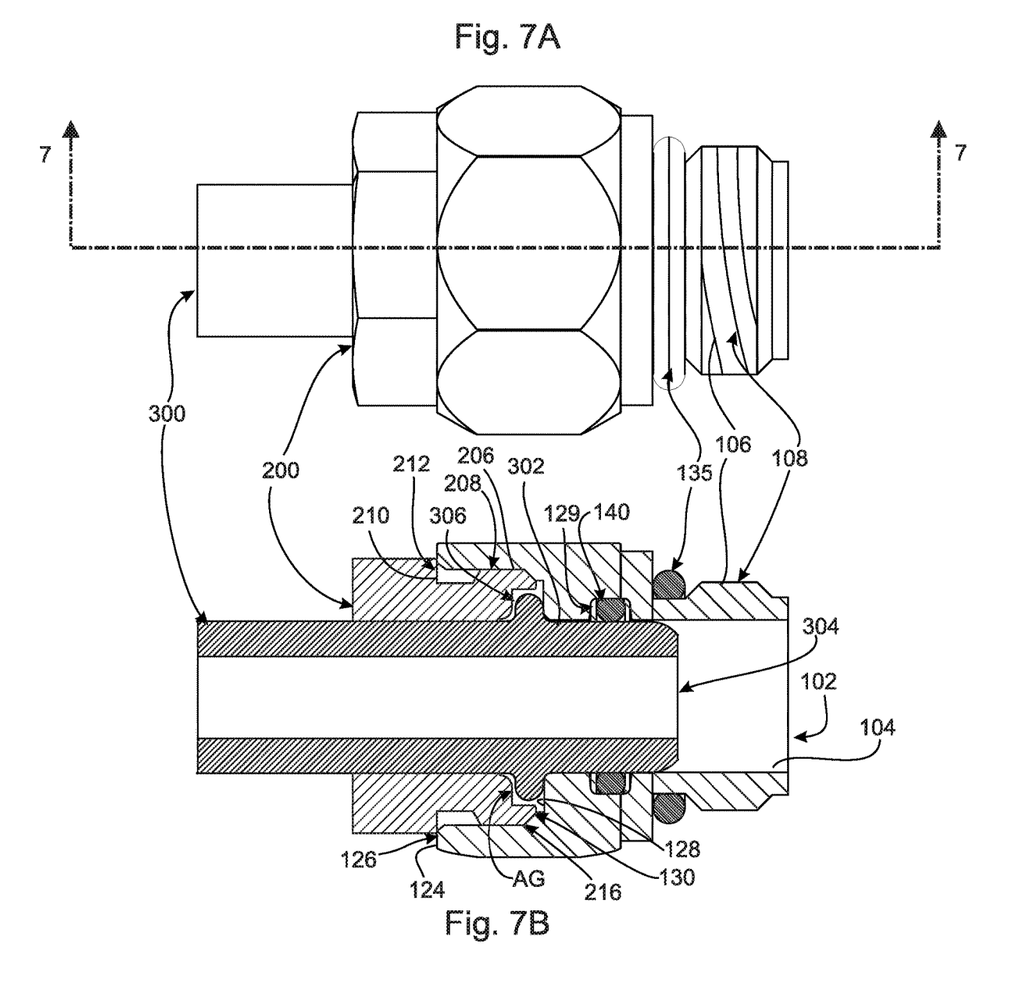
FIG. 7A is a side view of the fluid connector, threaded retainer, and tubular connector with the threaded retainer fully secured to the fluid connector.
FIG. 7B is a cross-sectional view of the fluid connector, threaded retainer, and tubular connector taken generally along line 7-7 in FIG. 7A with the threaded retainer fully secured to the fluid connector.

FIG. 7A and FIG. 7B are a side view and a cross-sectional view taken generally along line 7-7 in FIG. 7A of fluid connector 100, threaded retainer 200, and tubular connector 300 with threaded retainer 200 fully secured to fluid connector 100, respectively. After tubular connector 300 is fully inserted within fluid connector 100, threaded retainer 200 can be secured to fluid connector 100. Threads 208 of threaded retainer correspond with threads 122 of fluid connector 100. The mating of threads 122 and 208 allow fluid connector 100 to be secured to threaded retainer 200. In an example embodiment, threads 208 are male screw threads and threads 122 are female screw threads. It should be appreciated however, that threads 208 and 122 can be either male or female screw threads, provided they can secure fluid connector 100 to threaded retainer 200. As threaded retainer 200 is secured to fluid connector 100 via threads 122 and 208, shoulder 126 abuts against shoulder 212 along surfaces 124 and 210, respectively. This abutting of shoulders 126 and 212 allows threaded retainer 200 to "bottom out", as in preventing threads 208 from completely filing threads 122.

This bottoming out of threaded retainer 200 forms axial gap AG within through-bore 102. It should be appreciated that shoulders 126 and 212 and shoulders 130 and 216 could abut against each other simultaneously to form axial gap AG. Additionally, shoulders 126 and 212 and shoulders 130 and 216 can be vertical or angled parallel surfaces, arranged at a plurality of different angles. Even further, shoulders 126 and 212 and shoulders 130 and 216 can abut one another either one shoulder pair at a time, or simultaneously, depending on the embodiment of the present invention. Axial gap AG is formed by shoulder 216 of threaded retainer 200 and shoulder 130 of fluid connector 100, holding tube barb 306 captive between shoulders 130 and 216. In some embodiments, axial gap AG is formed between distal or insertion end 215 and shoulder surface 128. Additionally, shoulder 216 of threaded retainer 200 abuts against fluid connector 100 within through-bore 102. Axial gap AG allows tubular connector some axial movement, but allows tubular connector 300 to rotate relative to fluid connector 100 and threaded retainer 200 after securement within the assembly. Even with the rotational and axial movement of tubular connector 300, the assembly can still hold pressurized fluid since tubular connector 300 seals along surface 302 and seal 140.

Due to the interaction of threads 122 and 208, along with the abutting of shoulders 126 and 212, the connection of fluid connector 100 and threaded retainer 200 allows for a torque feedback which can be read in any a torque meter. The torque feedback is a crucial measurement to ensure that threaded retainer 200 is fully secured to fluid connector 100. As threaded retainer 200 is mated to fluid connector 100 via threads 122 and 208, the torque would increase and max out a specific value once shoulders 126 and 212 abut. It is important to leave space for axial gap AG to form, so a specific torque cutoff value would need to be established during the assembly process. This torque feedback allows an assembler to read the torque value to ensure proper assembly instead of relying on visual cues on the parts themselves, tactile feedback, or an audible indicator which could be difficult to hear in an assembly environment.

Figures 8A, 8B:
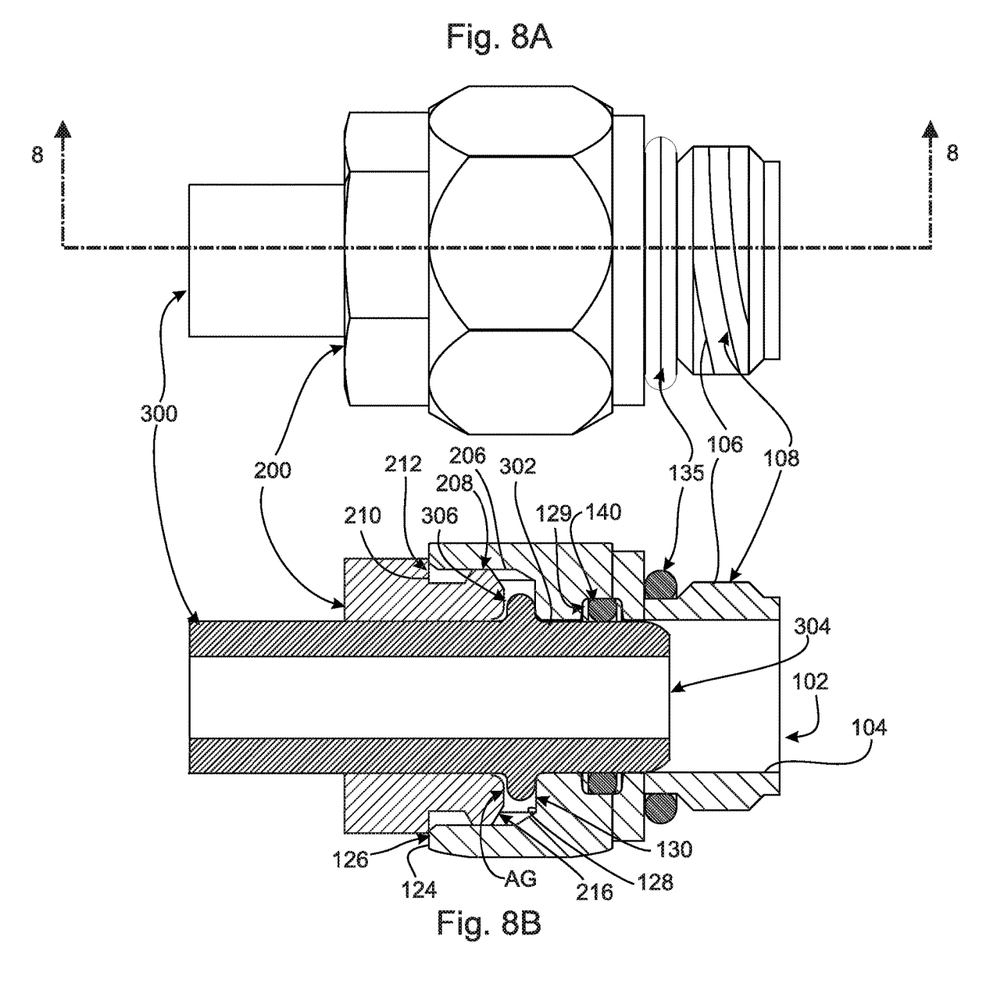
FIG. 8A is a side view of an example embodiment of the fluid connector, threaded retainer, and tubular connector with the threaded retainer fully secured to the fluid connector.
FIG. 8B is a cross-sectional view of an example embodiment of the fluid connector, threaded retainer, and tubular connector taken generally along line 8-8 in FIG. 8A with the threaded retainer fully secured to the fluid connector.

FIG. 8A and FIG. 8B are a side view and a cross-sectional view taken generally along line 8-8 in FIG. 8A of an example embodiment of fluid connector 100, threaded retainer 200, and tubular connector 300 with threaded retainer 200 fully secured to fluid connector 100, respectively. In this example embodiment, threaded retainer "bottoms out" along shoulder 126 against shoulder 212 along surfaces 124 and 210, respectively. Shoulder 216 of threaded retainer 200 does not abut against shoulder 130 of fluid connector 100 within through-bore 102. Axial gap AG forms by the abutting of shoulder 126 and shoulder 212 only.

Figure 9A:
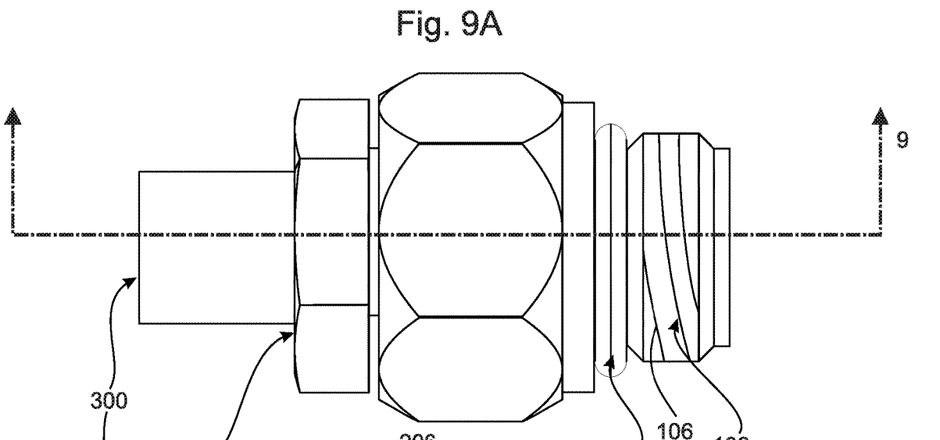
FIG. 9A is a side view of an example embodiment of the fluid connector, threaded retainer, and tubular connector with the threaded retainer fully secured to the fluid connector; and, FIG. 9B is a cross-sectional view of an example embodiment of the fluid connector, threaded retainer, and tubular connector taken generally along line 9-9 in FIG. 9A with the threaded retainer fully secured to the fluid connector.
Figure 9B:
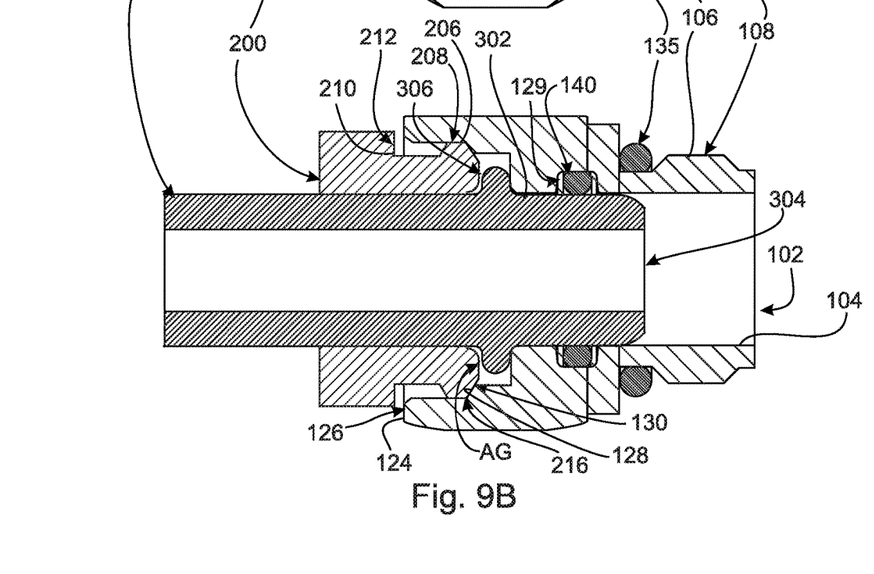

FIG. 9A and FIG. 9B are a side view and a cross-sectional view taken generally along line 9-9 in FIG. 9A of an example embodiment of fluid connector 100, threaded retainer 200, and tubular connector 300 with threaded retainer 200 fully secured to fluid connector 100, respectively. In this example embodiment, threaded retainer "bottoms out" along shoulder 216 against shoulder 130 within through-bore 102 of fluid connector 100. Shoulder 126 and shoulder 212 do not abut against one another along surfaces 124 and 210. Axial gap AG is formed by the abutting of shoulder 216 against shoulder 130 only. A gap is present between shoulder 212 of threaded retainer 200 and shoulder 126 of fluid connector 100.

In the foregoing description, example embodiments are described. The specification and drawings are accordingly to be regarded in an illustrative rather than a restrictive sense.

It will be appreciated that various aspects of the above-disclosed disclosure and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A threaded retainer, comprising:
a body, said body including a distal end and a first through-bore;
a first screw thread operatively arranged on an outer surface of said body, wherein, said first screw thread is arranged to secure said threaded retainer to a fluid connector including a second screw thread, said first screw thread corresponding with said second screw thread;
a tapered surface extending radially outward from said distal end to said first screw thread;
a first shoulder arranged on said body, wherein said first shoulder is arranged to abut against a second shoulder of said fluid connector; and,
an axial gap between said distal end and a third shoulder of said fluid connector, wherein said axial gap is formed when said fluid connector is secured to said threaded retainer.

2. The threaded retainer as recited in claim 1, wherein said fluid connector comprises a second through-bore extending linearly completely therethrough and forming an inner surface, said third shoulder being arranged in the second through-bore.

3. The threaded retainer as recited in claim 2, wherein said second screw thread is operatively arranged on said inner surface of said fluid connector.

4. The threaded retainer as recited in claim 2, wherein said first shoulder and said second shoulder abut within said second through-bore.

5. The threaded retainer as recited in claim 2, wherein said first shoulder and said second shoulder abut outside of said second through-bore.

6. The threaded retainer as recited in claim 2, wherein said first screw thread and said second screw thread form the axial gap within said second through-bore when secured together.

7. The threaded retainer as recited in claim 6, further comprising a tubular connector including a tube barb extending radially outward.

8. The threaded retainer as recited in claim 7, wherein said tube barb is operatively arranged within said axial gap.

9. The threaded retainer as recited in claim 8, wherein said tubular connector can rotate relative to said threaded retainer and said fluid connector.

10. A fluid connector assembly, comprising:
a threaded retainer comprising:
a first body, said body including a first distal end and a first through-bore, the first distal end including a distal end surface;
a first screw thread operatively arranged on an outer surface of said first body; and,
a first shoulder including a first shoulder surface arranged on said outer surface;
a first tapered surface extending radially outward from said first distal end to said first screw thread; and,
a fluid connector comprising:
a second body, said second body including a second through-bore extending linearly and completely therethrough, forming an inner surface;
a second screw thread formed on said inner surface;
a second shoulder including a second shoulder surface arranged at a second distal end on said second through-bore;
a second tapered surface extending radially inward from said second distal end to said second screw thread; and,
a third shoulder including a third shoulder surface arranged in said second through-bore, the third shoulder surface being parallel to the distal end surface, wherein an axial gap is formed between said first distal end and said third shoulder when said threaded retainer and said fluid connector are secured together.

11. The fluid connector assembly as recited in claim 10, wherein said first screw thread is arranged to secure said threaded retainer to said fluid connector via said second screw thread, said first screw thread corresponding with said second screw thread.

12. The fluid connector assembly as recited in claim 10, wherein said first shoulder surface and said second shoulder surface are parallel surfaces.

13. The fluid connector assembly as recited in claim 10, further comprising a tubular connector including a tube barb extending radially outward.

14. The fluid connector assembly as recited in claim 13, wherein said tube barb is operatively arranged within said axial gap.

15. The fluid connector assembly as recited in claim 14, wherein said tubular connector can rotate relative to said fluid connector and said threaded retainer.

16. The fluid connector assembly as recited in claim 10, wherein said first shoulder abuts against said second shoulder when said threaded retainer is secured to said fluid connector.

17. A fluid connector assembly, comprising:
a threaded retainer comprising:
a first body, said body including a first distal end, a first through-bore, and a first counter-bore connected to and extending axially from said first distal end;
a first screw thread operatively arranged on an outer surface of said first body; and,
a first shoulder arranged on said outer surface;
a fluid connector comprising:
a second body, said second body including:
a second distal end, a second through-bore, and a second counter-bore connected to and extending axially from said second distal end, the second counter-bore forming an inner surface;
a second screw thread formed on said inner surface of said second counter-bore;
a second shoulder arranged to abut against said first shoulder of said threaded retainer; and,
a third shoulder extending between said second through-bore and said second counter-bore, wherein, an axial gap is formed between said first distal end and said third shoulder when said threaded retainer and said fluid connector are secured together; and,
a tubular connector including a tube barb extending radially outward, said tube barb arranged within said axial gap, wherein said first counter-bore is arranged radially outward of said tube barb.

18. The threaded retainer as recited in claim 17, wherein said second shoulder of said fluid connector is arranged on said inner surface of said second counter-bore.

19. The threaded retainer as recited in claim 17, wherein said second shoulder of said fluid connector is an axially facing shoulder surface of said fluid connector, said surface arranged on the second distal end of said fluid connector.

20. The threaded retainer as recited in claim 17, wherein the second through-bore extends linearly and completely through the second body.

* * * * *